(No Model.) 2 Sheets—Sheet 1.
R. E. JEFFERY.
VEHICLE WHEEL.
No. 446,559. Patented Feb. 17, 1891.
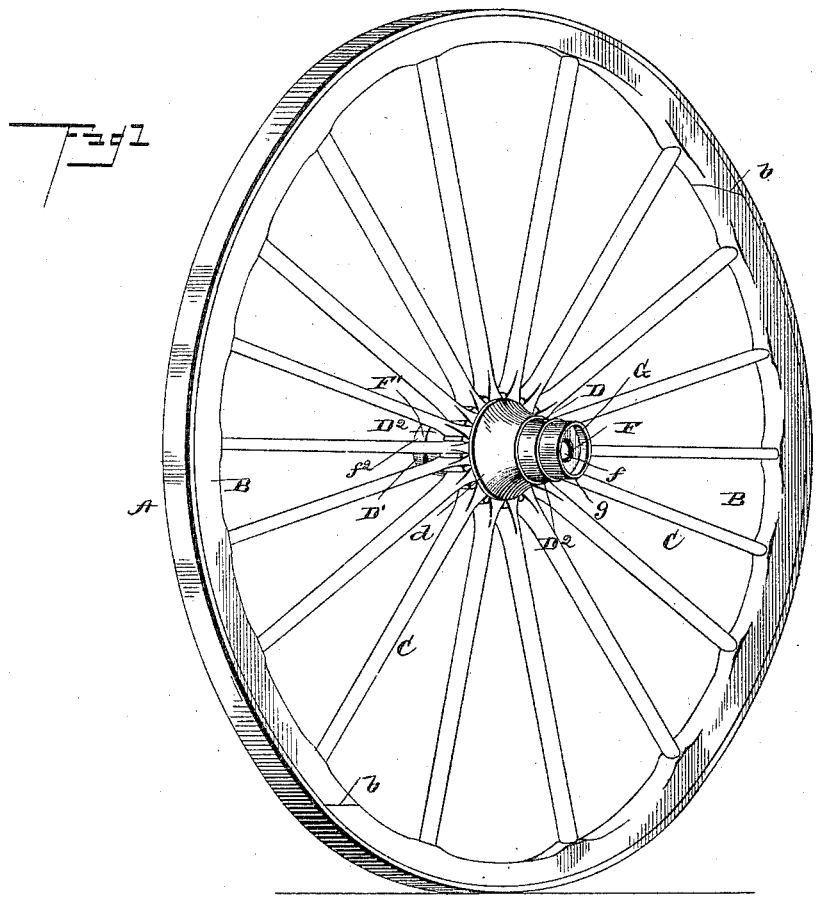
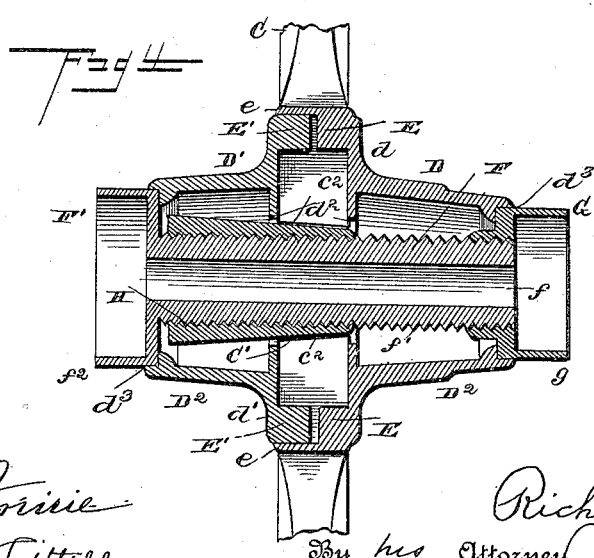
Witnesses
John Irwin
Chas. J. Littell,
Inventor
Richard E. Jeffery,
By his Attorney
J. R. Littell,
THE NORRIS PETERS CO., PHOTO-LITHO., WASHINGTON, D. C.

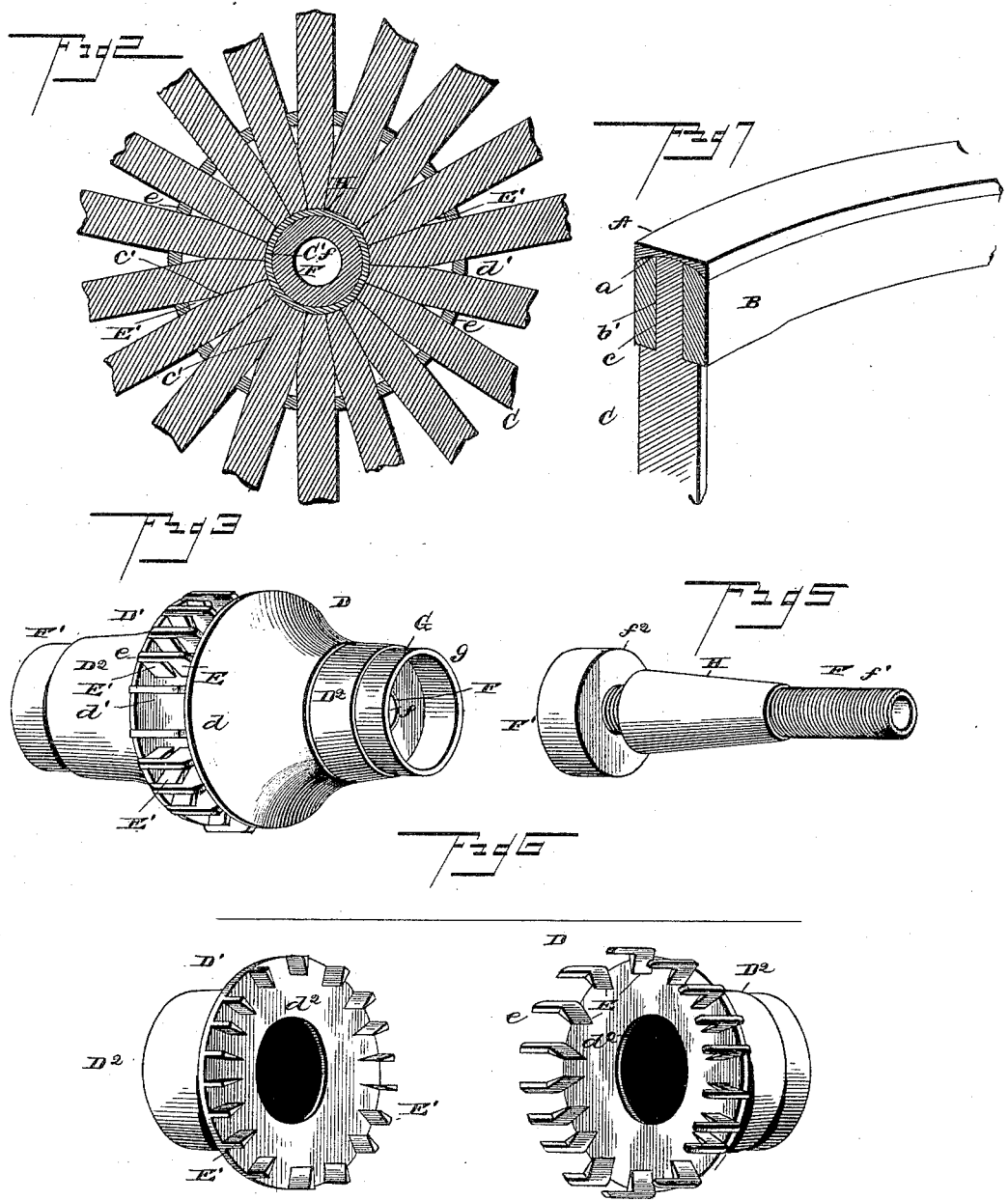

UNITED STATES PATENT OFFICE.

RICHARD EDGAR JEFFERY, OF GRASS VALLEY, CALIFORNIA.

VEHICLE-WHEEL.

SPECIFICATION forming part of Letters Patent No. 446,559, dated February 17, 1891.

Application filed July 20, 1890. Serial No. 356,315. (No model.)

*To all whom it may concern:*

Be it known that I, RICHARD EDGAR JEFFERY, a citizen of the United States, residing at Grass Valley, in the county of Nevada and State of California, have invented certain new and useful Improvements in Vehicle-Wheels; and I do hereby declare that the following is a full, clear, and exact description of the invention, which will enable others skilled in the art to which it appertains to make and use the same.

This invention relates to vehicle-wheels; and it has for its object to provide a simple and improved wheel of this character constructed entirely of interchangeable parts, whereby when one part thereof becomes broken or worn a duplicate may be quickly and readily substituted.

A further object of the invention is to provide, in combination with the hub, simple and improved means for tightening the spokes and tire or loosening the same when desired.

A further object of the invention is to so construct the felly and tire as to dispense with the necessity for securing bolts or rivets.

To this end the invention consists in the construction and arrangement of parts, as will be hereinafter more fully described, and set forth in the claims.

In the drawings, Figure 1 is a perspective view of a vehicle-wheel embodying my invention. Fig. 2 is a vertical sectional view thereof taken through the center of the hub. Fig. 3 is a detail perspective view of the hub removed. Fig. 4 is an enlarged vertical longitudinal sectional view. Fig. 5 is a detail perspective view of the tightening device. Fig. 6 is a similar view of the two sections forming the hub proper and illustrating the construction of the two-part ribs, which project between the spokes. Fig. 7 is a similar view of a section of the felly and tire.

Corresponding parts in the figures are denoted by the same letters of reference.

Referring to the drawings, A designates the tire provided with a hollowed or concave inner face $a$.

B designates the felly formed of two or more sections having their abutting ends $b$ correspondingly beveled, as shown. The periphery of the felly is formed rounded or convex, and is adapted to fit tightly within the hollowed inner face of the tire, the purpose of which will be hereinafter set forth.

C designates the spokes provided with reduced outer ends $c$, which fit within sockets $b'$, provided at equidistant points through the felly. The opposing sides of the spokes are beveled at their inner ends, as shown at $c'$, and abut against each other, and the extreme inner end of each spoke is correspondingly beveled, as shown at $c^2$, thus forming a flaring circular opening $C'$ at the center of the wheel.

The hub proper is formed in two sections D D', each section comprising a flat disk or plate $d$ $d'$, respectively, disposed one at each side the inner ends of the spokes. The disks $d$ and $d'$ are provided with corresponding circular openings $d^2$ $d^2$ at the center thereof and with reversely-projecting cylindrical flanges $D^2$ $D^2$ at the outer faces of the disks and inclosing the openings $d^2$. The flanges $D^2$ taper slightly from the disks and are provided in their extreme ends with a socket $d^3$ $d^3$. Upon the inner face of the disk $d$ at its periphery are provided the main portions E of inwardly-projecting equidistant ribs adapted to project between the spokes and retain the same rigid. The sections E of the ribs taper from their outer to their inner edges, as shown, and project to the transverse center of the spokes, and from the outer edges of said sections project extensions $e$, which overlap the periphery of the disk D'. To complete the ribs, the latter disk is provided with a correspondingly-disposed series of sections E' at the periphery thereof, said sections projecting under the extensions $e$ and abutting against the inner ends of the sections E, the sections E' being also tapered inwardly to correspond with the latter.

For securing the sections D and D' together I provide a core F, provided with a straight or tapering axle-bearing $f$ and with exterior screw-threads $f'$. The core F is also provided at its rear end with a circular plate F', having a rearwardly-projecting peripheral flange $f^2$, forming the inner flange of the hub, the adjacent end of said flange being adapted to project within the socket $d^3$ of the section D'. The core F projects through the center of the hub from the rear or inner end, and upon the projecting front threaded end is adapted to be screwed an interiorly-threaded retaining-cap G, provided with an outwardly-projecting peripheral flange $g$, serving as the outer flange of the hub, the inner end of said flange projecting within the socket $d^3$ of the section D.

H designates the tightening device, which consists of an interiorly-threaded conical-shaped sleeve adjustable upon the threads of the core F, and has its contracted end passed through the opening C', formed at the inner ends of the spokes from the flaring side of said opening.

In constructing my improved wheel the sections of the felly are first placed in position within the tire and the spokes inserted in the former. The sections of the hub are then disposed at the respective sides of the wheel and the ribs formed upon said sections projected between the spokes. The whole is then secured together by the core, which is passed through the hub from the rear or inner side (the tightening-sleeve having first been adjusted) and the retaining-cap applied to the free end of said core. As the retaining-cap is tightened, the tightening-sleeve is drawn outwardly, forcing the spokes toward the felly, and thus tightening the latter against the tire. The edges of the tire projecting down over the felly, the former is retained in place without the necessity of securing bolts or rivets.

The operation and advantages of my invention will be readily understood by those skilled in the art to which it appertains.

When it is desired to tighten the wheel, it is simply necessary to unscrew the core slightly, (the sleeve H remaining stationary during this operation owing to the pressure of the spokes thereon), bringing the tightening-sleeve nearer the outer end thereof, and then tightening the retaining-cap, thus drawing the sleeve farther forward and forcing the spokes outwardly. To loosen the wheel it is but necessary to partly unscrew the cap and then operate the core to draw the sleeve rearwardly, when the cap can be again screwed home.

I claim as my invention—

1. In a vehicle-wheel, the combination, with the spokes, of a sectional hub formed of two hollow sections, a core extending entirely through said sections and provided with a retaining-cap adapted to bind the parts together and secure the spokes, said core being exteriorly screw-threaded, and an interiorly-threaded conical sleeve working upon the core within the hub and adapted to engage the ends of the spokes, substantially as and for the purpose set forth.

2. In a vehicle-wheel, the combination, with a hollow hub and the spokes projecting therein, the hub being provided at each end with an interior annular shoulder, of a single exteriorly-threaded core projecting entirely through said hub and provided at one end with an integral circular plate having a rearwardly-extending unshouldered peripheral flange fitting within the adjacent end of the hub and abutting against the shoulder therein, a retaining-cap fitting within the opposite end of the hub and binding against the shoulder therein, and an interiorly-threaded conical sleeve working upon the core within the hub and adapted to adjust the spokes, substantially as and for the purpose set forth.

3. In a vehicle-wheel, the combination, with the spokes, of a hub formed of two sections comprising two circular plates provided with inwardly-projecting lugs, the lugs of one plate having each an extension projecting over the opposing lug of the other plate, said lugs forming conjunctively ribs fitting between the spokes, and a retaining-core and cap therefor for securing the sections of the hub together, substantially as set forth.

4. In a vehicle-wheel, the combination, with the tire provided with a hollowed or concave inner face, of the felly provided with a rounded or convex periphery adapted to fit within the latter and formed of two or more sections having their abutting ends beveled, the spokes, and the hub provided with means for tightening the wheel, substantially as set forth.

In testimony whereof I affix my signature in presence of two witnesses.

RICHARD EDGAR JEFFERY.

Witnesses:
 JAMES M. KITTS,
 CHAS. W. KITTS.